May 26, 1970     H. STOBER     3,513,764
INSTALLATION FOR VENTILATING VEHICLE INTERIOR SPACES
Filed Feb. 2, 1968

INVENTOR
HELMUT STOBER

BY *Craig & Antonelli*

ATTORNEYS

United States Patent Office 3,513,764
Patented May 26, 1970

---

3,513,764
INSTALLATION FOR VENTILATING VEHICLE INTERIOR SPACES
Helmut Stober, Doffingen, Wurttemberg, Germany, assignor to Daimler-Benz Aktiengesellschaft, Stuttgart-Unterturkheim, Germany
Filed Feb. 2, 1968, Ser. No. 702,712
Claims priority, application Germany, Feb. 4, 1967, D 52,200
Int. Cl. E06b *3/00*
U.S. Cl. 98—2     10 Claims

ABSTRACT OF THE DISCLOSURE

An installation for venting vehicle interior spaces in which venting apertures are provided in a structural element forming a part of the wall of the vehicle whereby the venting apertures are covered by a plate on the inside of the structural wall element so as to form a discharge channel by the spacing of the plate from the structural element while perforations are provided in the plate which are distributed over a large surface relative to the venting apertures in order to assure a draft-free ventilation.

BACKGROUND OF THE INVENTION

Figures 1, 2:
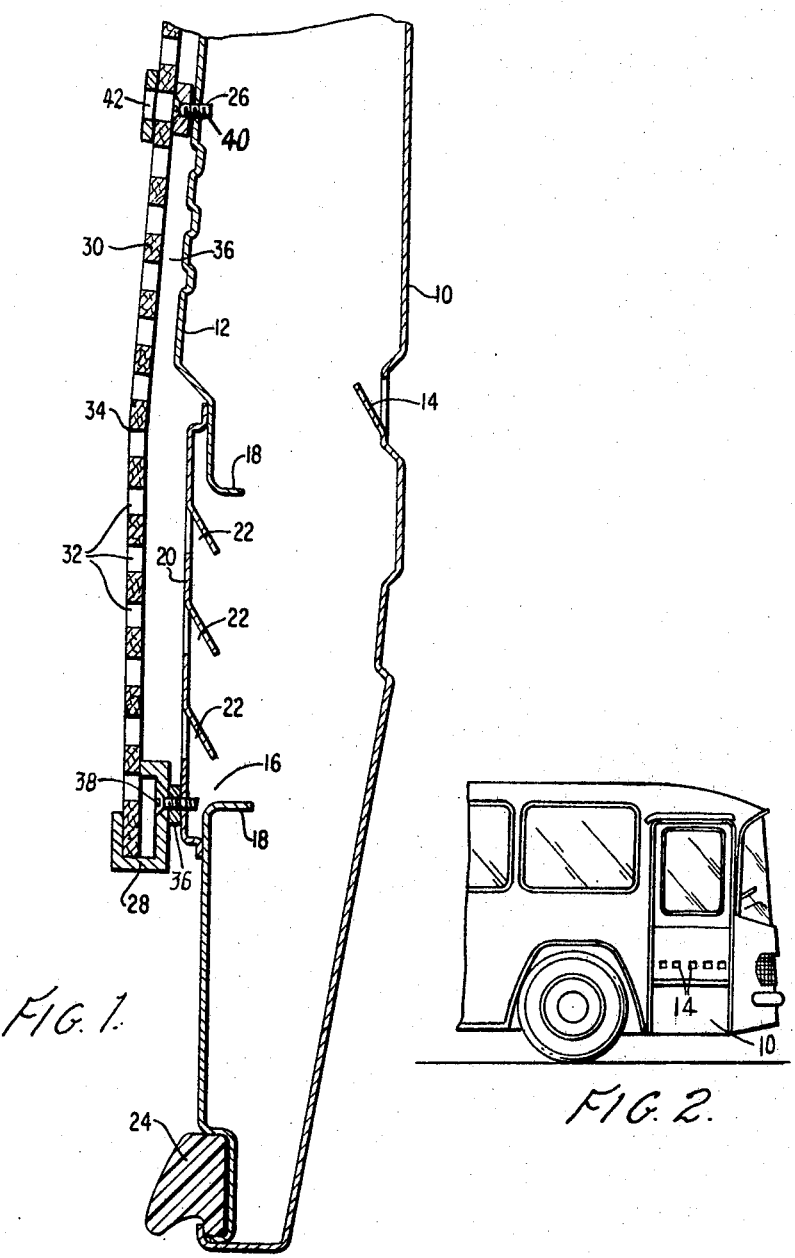

The present invention relates to an installation for ventilating vehicle interior spaces which is provided with venting apertures in a structural wall element.

In vehicles, especially in buses, it is known that an under-pressure or partial vacuum prevails on the outside approximately within the area of the forward bus doors whereas an excess-pressure prevails within the area of the bus rear section. These pressure conditions are utilized to cause air to circulate in the bus from the rear passenger space areas to the driver area. The air can thereby enter into the vehicle interior space and flow off again through slots in the bus walls and bus doors. Within the area of the forward bus doors one utilizes thereby so-called gills which are punched-out of the interior door sheet metal panel and outer door sheet metal panel and which project into the interior of the bus door. Since these gill-like elements must not possess an excessively large punched-out area in order not to weaken the bus door excessively, relatively rapid and well-defined air streams result therefrom, especially within the area of the driver which may entail the usual consequences of an air draft. Furthermore, the cleaning of the door within the area of the gills offers difficulties since the gill-like recesses are difficult to clean. Finally, with the known doors the inner sheet metal panels of the doors come directly into view because no padding can be accommodated thereat which would impair the air flow. Consequently, in case of an accident, the prior art doors constitute within this area a particularly dangerous area.

SUMMARY OF THE INVENTION

It is the aim of the present invention to create a ventilating system of the aforementioned type which is both draft-free as well as easy to clean and also safe in case of accidents.

The underlying problems are solved according to the present invention in that the venting apertures are covered on the inside of the structural wall element by a plate which has a spacing from the structural wall element to form a discharge channel and is provided with perforations that are distributed over a relatively large surface in relation to the venting apertures. Consequently, one can continue to retain the type of door construction utilized heretofore and may simply omit selectively the plate, for example, in ordinary trucks in which the aforementioned arguments play only a minor role.

It is of advantage if the plate is provided on the inside of the bus doors, especially of forward bus doors disposed within the driver area. Owing to the fact that the vacuum is particularly large within the area of these forward doors, the draft effect would also be largest in this area. In particular, the working conditions for the driver are improved by the installation according to the present invention which is especially important for such vehicles.

Accordingly, it is an object of the present invention to provide a ventilating system for the ventilation of vehicle interior spaces which obviates the aforementioned drawbacks and shortcomings of the prior art constructions by extremely simple and effective means.

Another object of the present invention resides in a ventilating system for ventilating the vehicle interior spaces which assures a substantially draft-free ventilation within the area of the driver without necessitating excessive weakening of door panels.

A further object of the present invention resides in a ventilating system for ventilating vehicle interior spaces, especially in such a system as is provided with gill-like ventilating apertures in the door structures which can be readily cleaned and at the same time is attractive from an aesthetic point of view.

Still another object of the present invention resides in a door construction for vehicles, especially buses, provided with ventilating apertures which eliminates injury-causing hazards to the passengers or drivers in case of accidents.

These and further objects, features, and advantages of the present invention will become more obvious from the following description when taken in connection with the accompanying drawing which shows, for purposes of illustration only, one embodiment in accordance with the present invention, and wherein:

FIG. 1 is a partial cross-sectional view through the lower area of the bus door; and FIG. 2 is a partial elevational view of a bus having a front bus door incorporating a ventilating installation in accordance with the present invention.

Referring now to FIG. 1 of the drawing, the bus door illustrated is delimited on the outside by an outer sheet metal door panel 10 and on the inside by an inner sheet metal door panel 12. An external gill-like element 14 is indicated in the outer sheet metal door panel 10 of which, however, several are present in practice, distributed and arranged in any suitable manner. The inner sheet metal door panel 12 is provided with a relatively larger aperture 16 which is delimited by a flange 18. The aperture 16 is covered by a gill cover 20 which is securely threadably secured in any conventional manner at the inner sheet metal door panel 12 and is provided with interior gill-like openings 22.

A sealing rubber element 24 is provided at the bottom of the door.

A plate 30 of apertured cardboard or the like, which is secured by retaining or clamping elements 26 and 28 of any conventional construction, is provided with a layer of polyvinyl chloride and covers the lower area of the inner sheet metal door panel 12. Retaining or clamping units 26 and 28 are secured to the interior sheet metal door member 12 and the gill cover 20, respectively, by any conventional means. As shown in the drawing, elements 26 and 28 are attached to the inner door panel 12 and the gill cover 20 by sheet metal screws 38 and 40. A ring means or the like 36 serves as a spacer means between the retaining element 28 and the gill cover 20 for the screw 38. Similarly, retaining or clamping element 26 is connected to the interior sheet metal door panel 12 by the screw 40 which is inserted through aperture 42. As seen in the figure, plate 30 can be removed by lifting the plate in a vertical direction until it is free of retaining or clamping elements 26 and 28, or the plate 30 can also be removed by first pulling it upwardly a short distance until it is free of element 28 and then pulling it out completely in the downward direction. The perforations 32 of the plate 30 can be readily recognized in the drawing.

The retaining or support elements 26 and 28 together with the bend 34 of the plate 30 relative to the interior sheet metal door panel 12 and the gill cover 20 provide such a position that a discharge channel 36 of large area results. The air can therefore penetrate through the plate 30 over a large surface and is able to reach the interior gills 22 without the occurrence of a draft.

FIG. 2 shows an embodiment of the ventilating installation in accordance with the present invention mounted in the front door of a bus.

The present invention also makes it possible to make the plate 30 of the same material as is used to normally cover the lower wall areas of the buses so that a uniform, smooth surface results and also a more uniform material can be utilized.

The bend 34 provides an additional reinforcement of the plate 30.

The plate can also consist of cardboard-like material such as hardboard, pressboard or compressed cardboard which is covered on the outside with any conventional foam material. The mounting and securing of the plate 30 can be realized without difficulty in such a manner that it can be readily installed and taken off again.

While I have shown and described only one embodiment in accordance with the present invention, it is understood that the same is not limited thereto but is susceptible to numerous changes and modifications as known to a person skilled in the art, and I therefore do not wish to be limited to the details shown and described herein but intend to cover all such changes and modifications as are encompassed by the disclosure as recited above.

I claim:
1. An installation in a vehicle for ventilating the interior spaces of the vehicle wherein the improvement comprises
    a structural wall element of the vehicle comprising an outer panel and an inner panel provided with venting apertures,
    substantially rigid plate means connectably associated with the interior side of the structural wall element and covering the venting apertures of the inner panel,
    said plate means being open to the interior spaces of the vehicle and being spaced from the inner panel so as to form a discharge channel,
    and said plate means being provided with ventilating apertures distributed over a relatively large surface with respect to the venting apertures.

2. An installation according to claim 1, wherein said vehicle is a bus and the structural wall element is a door of the bus.

3. An installation according to claim 2, wherein the bus door is the forward door within the area of the driver.

4. An installation according to claim 2, further comprising means for readily detachably mounting said plate means on said structural wall element.

5. An installation according to claim 1, wherein the plate means is covered with a plastic coating.

6. An installation according to claim 1, wherein the plate means is covered with a foamed material.

7. An installation according to claim 1, further comprising means for readily detachably mounting said plate means on said structural wall element.

8. An installation according to claim 1, wherein the plate means is made from cardboard material.

9. An installation according to claim 8, wherein the plate means is covered with a plastic coating.

10. An installation according to claim 8, wherein the plate means is covered with a foamed material.

References Cited

UNITED STATES PATENTS

| | | | |
|---|---|---|---|
| 3,059,561 | 10/1962 | Wilfert | 98—2 |
| 3,061,056 | 10/1962 | Kodaras | 98—87 |
| 3,357,338 | 12/1967 | Pollock | 98—2 |
| 3,366,026 | 1/1968 | Herr | 98—2 |

MEYER PERLIN, Primary Examiner

U.S. Cl. X.R.

98—87